(12) United States Patent
Yang

(10) Patent No.: US 6,758,603 B2
(45) Date of Patent: Jul. 6, 2004

(54) OPTICAL CONNECTOR ASSEMBLY

(75) Inventor: Sunney Yang, Hershey, PA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 164 days.

(21) Appl. No.: 10/191,199

(22) Filed: Jul. 8, 2002

(65) Prior Publication Data

US 2004/0005121 A1 Jan. 8, 2004

(51) Int. Cl.$^7$ ................................................ G02B 6/36
(52) U.S. Cl. ........................ 385/78; 385/56; 385/60; 385/61; 385/62; 385/72; 385/75; 385/76; 385/79; 385/80; 385/81
(58) Field of Search ........................... 385/78, 60, 61, 385/62, 72, 75, 76, 56, 79, 80, 81

(56) References Cited

U.S. PATENT DOCUMENTS 5,216,733 A * 6/1993 Nagase et al. ............... 385/60

2003/0219214 A1 * 11/2003 Lee ............................. 385/78

* cited by examiner

Primary Examiner—Dean A. Reichard
Assistant Examiner—Jinhee Lee
(74) Attorney, Agent, or Firm—Wei Te Chung

(57) ABSTRACT

An optical connector subassembly (1) includes a ferrule (2), a base member (4) and a locking element (6). The ferrule defines an axial passageway (22) for receiving a core of an optical cable and a plurality of holes (24) provided on an outer surface of the ferrule. The base member has a space (42) for receiving a lower portion of the ferrule, a bore (46) that is formed along a central axis of the base member and ends in a funnel (48) for guiding an optical fiber into the passageway, and a plurality of openings (44) formed on the upper portion of the base member and corresponding to the holes of the ferrule and communicating with the receiving space. The locking element has a plurality of free extension portions (62) that extend through the corresponding openings and into the corresponding holes to join the ferrule and the base member together.

4 Claims, 3 Drawing Sheets

OPTICAL CONNECTOR ASSEMBLY

FIELD OF THE INVENTION

The present invention relates to optical connectors, and particularly to an optical connector subassembly comprising a ferrule and a base member

BACKGROUND OF THE INVENTION

Optical fiber connectors are an essential part of substantially any optical fiber communication system. Optical fiber connectors generally have two functions, one being the maintenance of two optical fiber ends such that the core of one of the fibers is axially aligned with the core of the other fiber to allow substantially all of the light from one fiber to be coupled into the other fiber. This is a particularly challenging task because the light-carrying region (core) of an optical fiber is very small. The other function of an optical connector is to provide mechanical stability and protection to the junction in its working environment. Achieving low insertion loss in the coupling of two fibers is generally a function of the alignment of the fiber ends, the width of the gap between the ends, and the optical surface condition of either or both ends. Stability and junction protection is generally a function of connector design, for example, minimization of the different thermal expansion and mechanical movement effects.

A variety of connector plugs are known in the art. For a discussion of optical fiber connectors, see, for example, Optical Fiber Telecommunication, S. E. Miller and A. G. Chynoweth, editors, Academic Press (1988), especially pp.301–325. One of the known connector plugs is shown in U.S. Pat. No. 4,934,785. The connector plug comprises a ferrule, a base member which holds the ferrule, a compression spring, and a cap that surrounds the ferrule and the spring. The ferrule is held rigidly in the base member by an adhesive. The ferrule and the base member each include an opening that extends lengthwise from one end to the other. For clarity, each opening will be referred to as a "passageway" when discussing the ferrule, and a "bore" when discussing the base member. The central axis of the passageway and the bore need to be axially aligned—particularly in the region where the ferrule meets the base member so that an optical fiber can be threaded along their common axis. And while manufacturing tolerances may approach "zero", practical considerations such as cost have dictated that axial alignment tolerance be relaxed while still assuring that an optical fiber can pass through the junction where the bore of the base member meets the passageway of the ferrule. Heretofore, this concern has been handled by designing a fiber entry funnel in the proximal end of the ferrule where the fiber is inserted. Such a funnel can be produced in a variety of different ways such as by grinding, etching, or fire polishing. However, this is a process that consumes time and resources and ultimately leads to a product having a higher final cost.

In addition, the method of joining the ferrule with the base member by an adhesive has the following drawbacks. First, the adhesive can frequently enter the funnel and then block the entry of the optical fiber during the adhesive process. Secondly, the ferrule will become separated from the base member if the adhesive loses effectiveness over time. Furthermore, the joining method is costly and time-consuming.

Therefore, an improved optical connector subassembly having a ferrule and a base member that overcomes the above-mentioned disadvantages is desired.

SUMMARY OF THE INVENTION

A main object of the present invention is to provide an optical subassembly which has a ferrule and a base member which are joined firmly together and which have their central axes accurately axially aligned.

Another object of the present invention is to provide a cheap optical subassembly which is manufactured easily and efficiently.

To achieve the above objects, an optical connector subassembly comprises a ferrule, a base member and a locking element. The ferrule defines an axial passageway for receiving a core of an optical cable, and a plurality of holes provided in an outer surface of the ferrule. The base member has a receiving space for receiving a lower portion of the ferrule, a bore that is formed along a central axis of the base member and ends in a funnel for guiding an optical fiber into the passageway, and a plurality of openings formed in an upper portion of the base member corresponding to the holes of the ferrule and communicating with the receiving space. The locking element has a plurality of free extension portions that extend through the corresponding openings in the base member and into the corresponding holes of the ferrule to join the ferrule and the base member together.

Other objects, advantages and novel features of the invention will become more apparent from the following detailed description of a preferred embodiment thereof when taken in conjunction with the accompanying drawings, wherein:

DETAILED DESCRIPTION OF THE INVENTION

Figure 1:
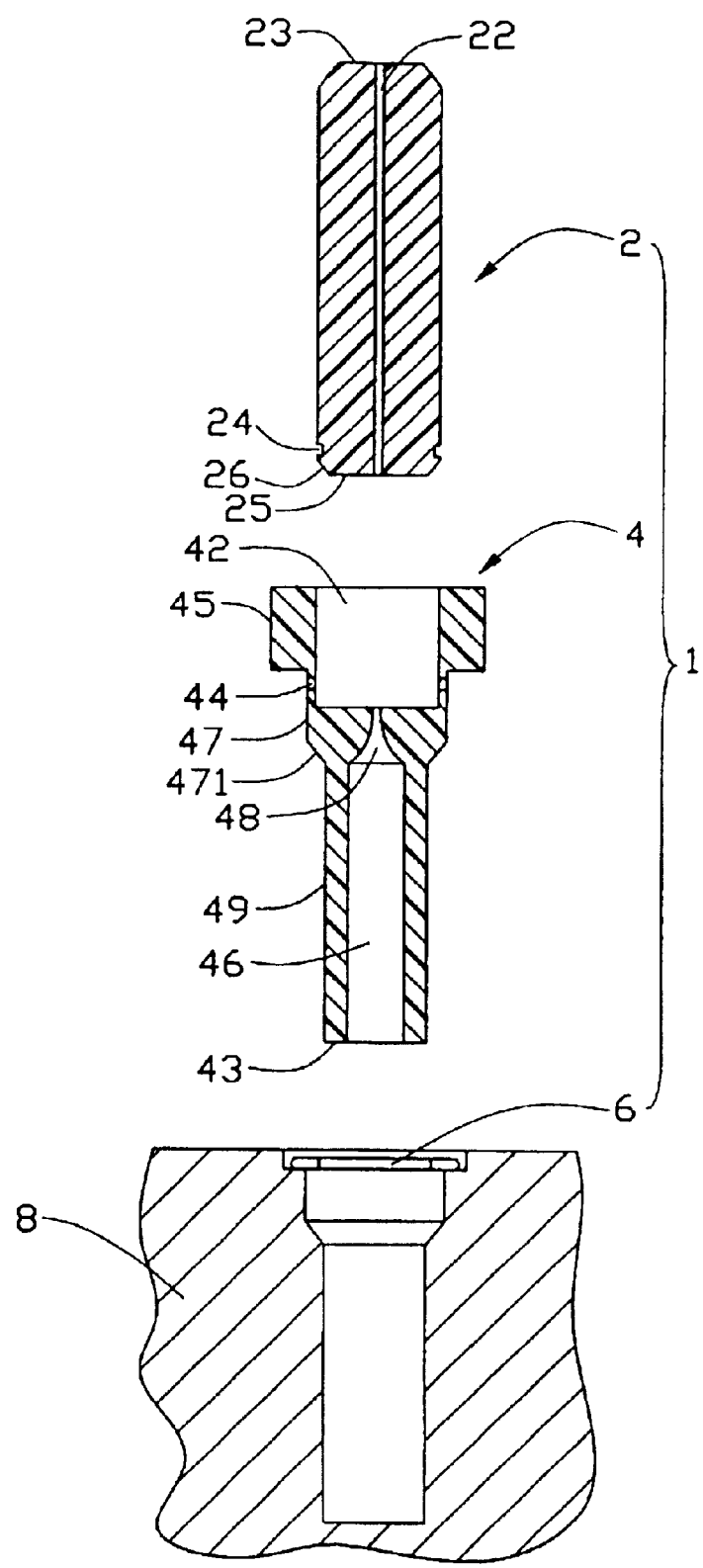
FIG. 1 is an exploded, cross-sectional view of an optical subassembly of the present invention, having a ferrule, a base member and a locking element, with the locking element laying within a working table used to assemble the optical subassembly.

Referring now to the drawings in detail, FIG. 1 shows an optical connector subassembly in accordance with a preferred embodiment of the present invention. The optical subassembly 1 comprises a cylindrical ferrule 2, a base member 4 and a locking element 6.

The ferrule 2 includes a narrow passageway 22 along its central axis that extends from its upper end face 23 to its lower end face 25 for receiving a core (not shown) of an optical fiber (not shown). A pair of blind holes 24 is defined at an outer surface of the ferrule 2 adjacent to the lower end face 25 and a chamfer 26 is provided between the blind holes 24 and the lower end face 25. In the present invention, the ferrule 2 is made of ceramic or glass.

The base member 4 comprises, from upper to lower, a flange 45, a neck 47 and a tail portion 49. A sloped surface 471 is formed on the neck 47 to connect with the tail portion 49. In a preferred embodiment of the present invention, the base member 4 is made of plastic. A space 42 for receiving the lower portion of the ferrule 2 is formed through an interior of the flange 45 and terminates at the middle of the neck 47. A bore 46 is defined along a common central axis of the tail portion 49 and the neck 47 from the bottom end face 43 and ends in an entry funnel 48 which communicates with the space 42. The entry funnel 48 is used to guide the optical fiber into the passageway 22 with little clearance (typically less than 1 μm for singlemode). A pair of openings 44 is formed in the upper portion of the neck 47 of the base member 4 corresponding to the blind holes 24 of the ferrule 2 and communicating with the space 42.

Figure 4:
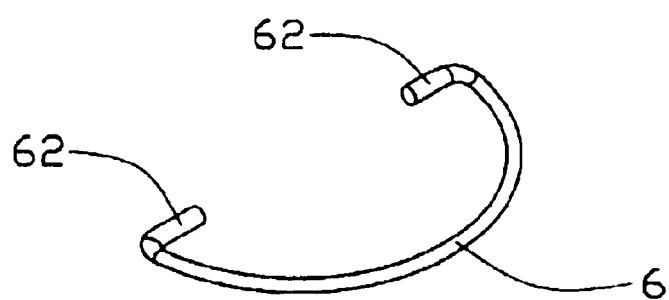
FIG. 4 is a perspective view of the locking element of FIG. 1.

FIG. 4 shows the locking element 6 according to a preferred embodiment of the present invention. The locking element 6 is made of spring steel and is a C-shaped ring. A pair of free extension portions 62 extends from the both ends of the locking element 6.

Figure 2:
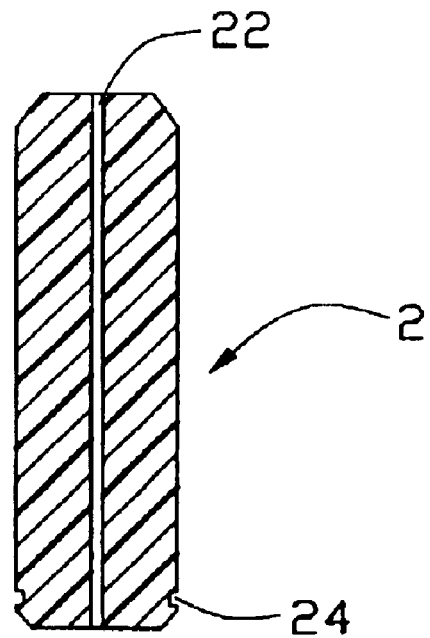
FIG. 2 is a cross-sectional view of the optical subassembly of FIG. 1, wherein the locking element and the base member are joined together.
Figure 2:
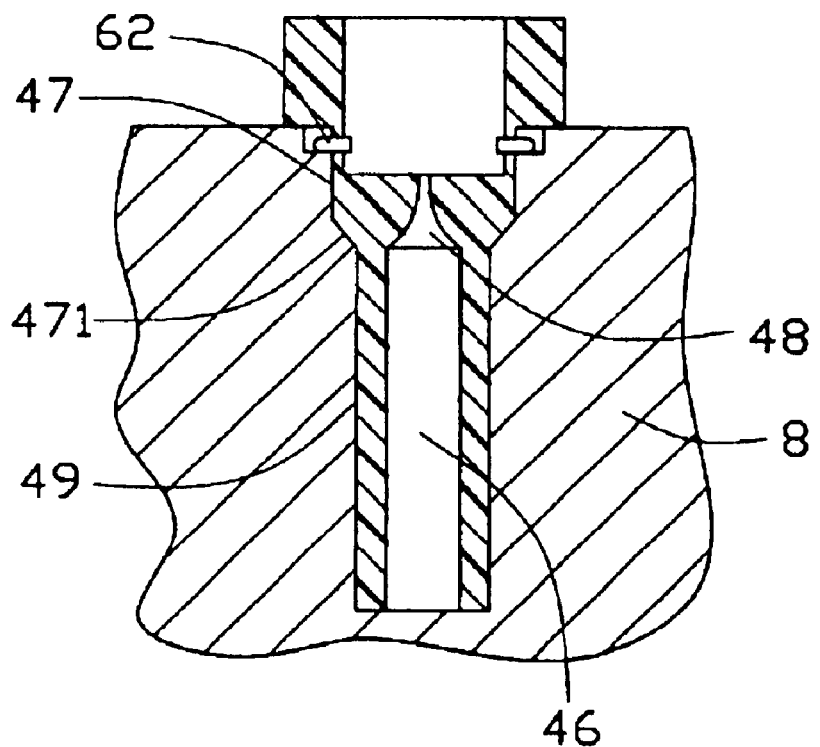
Figure 3:
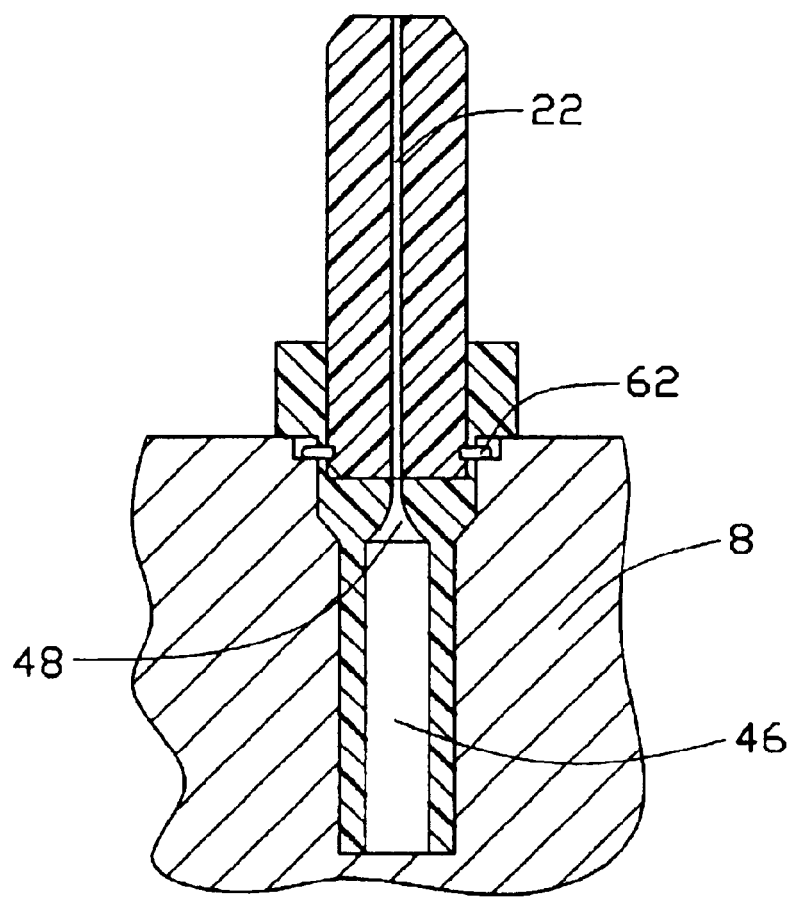
FIG. 3 is a cross-sectional view of the assembled optical subassembly of FIG. 1, still sitting in the working table.

During the assembly of the optical assembly 1, the base member 4 is combined with the locking element 6 in a first step. In the process of combination, the locking element 6 is secured to a working table 8, and then the tail portion 49 of the base member 4 is put into the locking element 6 and extends therethrough. When the base member 4 goes on moving downwardly, the sloped surface 471 of the neck 47 will contact and push outwardly the free extension portions 62, and then make the free extension portions 62 separate from each other until the distance between the free extension portions 62 is equal to the diameter of the neck 47. Lastly, the free extension portions 62 move upwardly along the surface of the neck 47 and ultimately into the openings 44, as shown in FIG. 2.

In a second step of the assembly, the ferrule 2 is inserted into the space 42 of the base member 4. In the process of insertion, the ferrule 2 moves downwardly and then the chamfer 26 of the ferrule 2 contacts and presses the free extension portions 62 so that the free extension portions 62 separate from each other again until the distance between the free extension portions 62 is equal to the diameter of the ferrule 2; and consequently, the free extension portions 62 slide into the blind holes 24. Thus, the locking element 6 combines the ferrule 2 with the base member 4 firmly through the engagement of the free extension portions 62 with the openings 44 and the blind holes 24. It is easily understood that the assembly procedure alternatively include inserting the ferrule 2 into the base member 4 first, and then combining the locking element 6 with the ferrule 2 and the base member 4 together.

Compared with the prior art, the method of joining the ferrule 2 with the base member 4 according to the present invention is more easily done and results in a more firm joint than the prior art joining method, and ensures more accurate axial alignment of the central axes of the ferrule 2 and base member 4. In addition, the funnel 48 formed in the base member 4 is more easily formed than that formed in the ferrule described in the prior art because the base member is generally made of plastic, while the ferrule is generally made of glass or ceramic. In other words, the funnel 48 can be integrally formed with the base member 4 so as to make the manufacture of the optical connector subassembly more cheap and efficient.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. An optical connector subassembly comprising: a ferrule defining an axial passageway for receiving a core of an optical cable, and a plurality of holes being defined on an outer surface of the ferrule; a base member having a receiving space for receiving a lower portion of the ferrule, a bore being defined along a central axis of the base member, the bore ending in a funnel for guiding an optical fiber into the passageway, and a plurality of openings being defined in an upper portion of the base member, the plurality of openings corresponding to the plurality of holes of the ferrule and communicating with the receiving space; a locking element having a plurality of free extension portions which extends through the corresponding openings of the base member and into the corresponding plurality of holes of the ferrule to join the ferrule and the base member together, wherein the base member comprises, from upper to lower, a flange, a neck and a tail portion, and a sloped surface of the neck is formed to connect with the tail portion, and wherein the plurality of openings of the base member are formed in an upper portion of the neck of the base member.

2. The optical connector subassembly as claimed in claim 1, wherein the locking element is a C-shaped ring.

3. The optical connector subassembly as claimed in claim 1, wherein the locking element is made of spring steel.

4. The optical connector subassembly as claimed in claim 1, wherein the plurality of holes are defined at an outer surface of the ferrule and a chamfer is provided on the outer surface between the holes and a lower end face of the ferrule.

* * * * *